Patented Apr. 23, 1940

2,198,468

UNITED STATES PATENT OFFICE 2,198,468

TRIARYLMETHANE DYESTUFFS CAPABLE OF BEING CHROMED

Paul Herbert Wolff, deceased, late of Frankfort-on-the-Main-Hochst, Germany, by Richard Wenzel, administrator, Frankfort - on - the-Main - Hochst, Germany, and Karl Frank, Frankfort-on-the-Main-Hochst, Germany, assignors to General Aniline & Film Corporation, a corporation of Delaware No Drawing. Application September 29, 1938, Serial No. 232,302. In Germany November 3, 1937

4 Claims. (Cl. 260—394)

The present invention relates to triarylmethane dyestuffs capable of being chromed.

We have found that valuable triarylmethane dyestuffs capable of being chromed are obtainable by condensing 1 mol of 2-sulfo-4-hydroxy-5-carboxy-benzaldehyde with 2 mols of an aromatic amine and oxidizing the leuco-acid thus obtained. According to this process a series of new dyestuffs are obtained, for instance, those of the following general formula

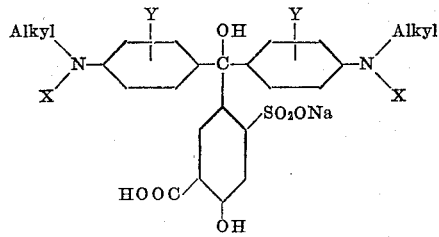

wherein alkyl means a lower alkyl group, X represents a member of the group consisting of hydrogen and a lower alkyl group and Y represents a member of the group consisting of hydrogen and a methyl group. The new dyestuffs dye the animal fiber very clear green tints. The properties of fastness of these dyeings are essentially enhanced by after-chroming by which operation the shade varies somewhat towards blue.

The 2-sulfo-4-hydroxy-5-carboxy-benzaldehyde, hitherto unknown, may be obtained by the introduction of the aldehyde group into the 4-chloro-2-hydroxybenzoic acid by the process of Reimer-Tiemann and substitution of the chlorine by a sulfo-group by means of sodium sulfite as indicated more fully in the Example 1 herein.

The following examples serve to illustrate the invention, but they are not intended to limit it thereto, the parts being by weight:

1. 81 parts of sodium 4-hydroxy-5-carboxy-benzaldehyde-2-sulfonate are heated together with 100 parts of diethylaniline in 300 parts of sulfuric acid of 10 per cent strength at about 95° C. until the condensation is finished; this is the case after about 80 hours. The leuco-acid thus produced, which is insoluble in water, is dissolved with aid of sodium carbonate in water, to make a neutral solution and is then oxidized to the dyestuff in known manner, for instance, by means of lead peroxide in the presence of an acid. The isolated dyestuff in the form of the sodium salt dyes wool and silk in an acid bath pure green tints. By after-chroming, the shade is somewhat shifted to blue and the properties of fastness are enhanced. The dyestuff has probably the following constitution:

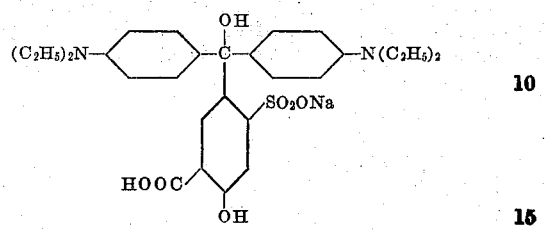

The 4-hydroxy-5-carboxy-benzaldehyde-2-sulfonic acid used as parent material may be obtained in the following manner:

173 parts of 4-chloro-2-hydroxybenzoic acid are heated at 65° C. in a solution of 400 parts of caustic soda in 445 parts of water. 230 parts of chloroform are run into this solution at a temperature between 65° C. and 70° C. and the whole is heated for 8 hours at 70° C. From the solution thus obtained the 2-chloro-4-hydroxy-5-carboxy-benzaldehyde is obtained by acidification; it may be purified by way of its bisulfite compound and freed from unchanged parent materials. 223 parts of the sodium salt of the aldehyde thus obtained are heated together with a concentrated aqueous solution of 130 parts of sodium sulfite at 160° C. in a pressure vessel for 7 hours. From the clear solution thus produced there is obtained, by acidification, the 2-sulfo-4-hydroxy-5-carboxy-benzaldehyde in the form of its acid sodium salt.

2. By using in Example 1 instead of the diethylaniline 108 parts of N-butyl-ortho-toluidine and otherwise proceeding in the manner therein described, a dyestuff having similar properties is obtained.

3. By using in Example 2 instead of N-butyl-ortho-toluidine 126 parts of N-butyl-ethyl-meta-toluidine a dyestuff of similar properties is obtained having, however, a more yellowish shade.

4. By using in Example 1 instead of the diethylaniline 89 parts of N-ethyl-ortho-toluidine and otherwise proceeding in the manner therein described a dyestuff of similarly good properties of fastness is obtained whose green shade is, on after-chroming, shifted to green-blue.

We claim:

1. The compounds of the general formula

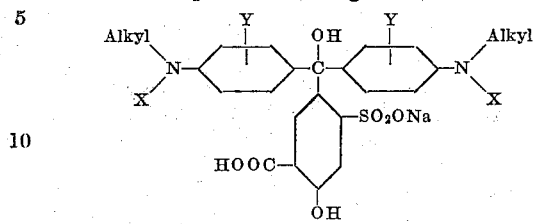

wherein alkyl means a lower alkyl group, X represents a member of the group consisting of hydrogen and a lower group and Y represents a member of the group consisting of hydrogen and a methyl group, being dyestuffs which dye the animal fiber very clear green tints whose properties of fastness are essentially enhanced by after-chroming.

2. The compound of the formula

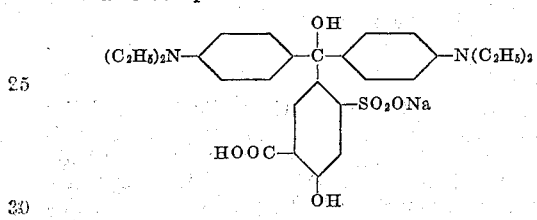

being a dyestuff which dyes wool and silk in an acid bath pure green tints which, on after-chroming, are somewhat shifted to blue and whose properties of fastness are enhanced.

3. The compound of the formula

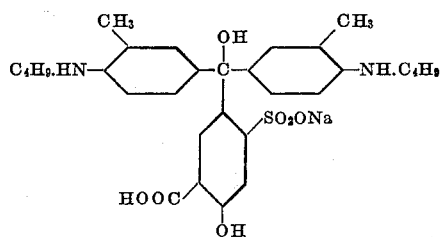

being a dyestuff which dyes wool and silk in an acid bath pure green tints which, on after-chroming, are somewhat shifted to blue and whose properties of fastness are thereby enhanced.

4. The compound of the formula

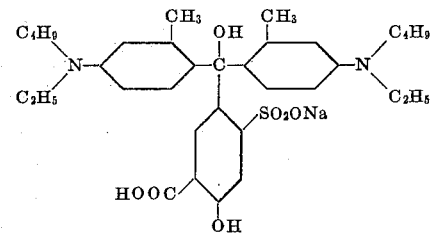

being a dyestuff which dyes wool and silk in an acid bath yellowish green tints whose properties of fastness are essentially enhanced by after-chroming.

RICHARD WENZEL,
*Administrator of the Estate of Paul Herbert Wolff, Deceased.*

KARL FRANK.